United States Patent
Cheong et al.

(10) Patent No.: US 11,630,950 B2
(45) Date of Patent: Apr. 18, 2023

(54) PREDICTION OF MEDIA SUCCESS FROM PLOT SUMMARIES USING MACHINE LEARNING MODEL

(71) Applicant: RESEARCH & BUSINESS FOUNDATION SUNGKYUNKWAN UNIVERSITY, Suwon-si (KR)

(72) Inventors: Yun Gyung Cheong, Anyang-si (KR); You Jin Kim, Jinju-si (KR); Jung Hoon Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 122 days.

(21) Appl. No.: 17/134,581

(22) Filed: Dec. 28, 2020

(65) Prior Publication Data
US 2021/0200945 A1    Jul. 1, 2021

(30) Foreign Application Priority Data
Dec. 31, 2019    (KR) .......................... 10-2019-0179963

(51) Int. Cl.
*G06F 40/205* (2020.01)
*G06F 40/279* (2020.01)

(52) U.S. Cl.
CPC .......... *G06F 40/205* (2020.01); *G06F 40/279* (2020.01)

(58) Field of Classification Search
CPC .............................. G06F 40/205; G06F 40/279
See application file for complete search history.

(56) References Cited

U.S. PATENT DOCUMENTS 10,657,575 B2 * 5/2020 Prendki .............. G06Q 30/0621
11,210,324 B2 * 12/2021 Quirk ..................... G06F 40/35

FOREIGN PATENT DOCUMENTS

KR    10-2019-0064803 A    6/2019
KR    10-2019-0125153 A    11/2019

OTHER PUBLICATIONS

Varshit, Battu, Batchu Venkat Vishal, Dakannagari Mohana Murali Krishna Reddy, and Radhika Mamidi, "Sentiment as a Prior for Movie Rating Prediction", 2018, In Proceedings of the 2nd International Conference on Innovation in Artificial Intelligence, Association for Computing Machinery, pp. 148-153. (Year: 2018).*

(Continued)

*Primary Examiner* — Paras D Shah
*Assistant Examiner* — James Boggs
(74) *Attorney, Agent, or Firm* — NSIP Law

(57) ABSTRACT

Disclosed is a machine learning-based media success prediction through plot summaries According to an embodiment, a method comprises performing preprocessing on text data including a plot summary, calculating a sentiment score from the preprocessed text data using a first model, generating first input data using the calculated sentiment score, generating second input data from the preprocessed data using a second model, and determining a candidate class of content corresponding to the plot summary by applying the first input data and the second input data to a pre-trained third model. The candidate class includes a first class indicating success and a second class indicating failure.

13 Claims, 7 Drawing Sheets

(56) References Cited

OTHER PUBLICATIONS

Verma, Garima and Hemraj Verma, "Predicting Bollywood Movies Success Using Machine Learning Technique", Feb. 2019, Amity International Conference on Artificial Intelligence (AICAI), pp. 102-105. (Year: 2019).*

Zhang, Yangsen, Jia Zheng, Yuru Jiang, Gaijuan Huang, and Ruoyu Chen, "A Text Sentiment Classification Modeling Method Based on Coordinated CNN-LSTM-Attention Model", Jan. 2019, Chinese Journal of Electronics, vol. 28, No. 1, pp. 120-126. (Year: 2019).*

Kumar, Sudhanshu, Shirsendu S. Halder, Kanjar De, and Partha Pratim Roy, "Movie Recommendation System using Sentiment Analysis from Microblogging Data", Nov. 2018, arXiv:1811.10804, pp. 1-19. (Year: 2018).*

Peters, Matthew E., Mark Neumann, Mohit Iyyer, Matt Gardner, Christopher Clark, Kenton Lee, and Luke Zettlemoyer, "Deep Contextualized Word Representations", 2018, Proceedings of NAACL-HLT 2018, vol. 1, pp. 2227-2237. (Year: 2018).*

Manishina, Elena, Dylan Tweed, Guillaume Tiberi, Lorena Gayarre Pena, Nicolas Martin, "Detecting Negativity in User Comments Using Emotional Maps and Convolutional Neural Networks", Sep. 2019, ACIIW, 2019 8th International Conference, pp. 205-208. (Year: 2019).*

Zhou, Junhao, Yue Lu, Hongning Dai, Hao Wang, and Hong Xiao, "Sentiment Analysis of Chinese Microblog Based on Stacked Bidirectional LSTM", Apr. 2019, IEEE Access, vol. 7, pp. 38856-38866. (Year: 2019).*

Chaovalit, Pimwadee and Lina Zhou, "Movie Review Mining: a Comparison between Supervised and Unsupervised Classification Approaches", 2005, Proceedings of the 38th Annual Hawaii International Conference on System Sciences, pp. 1-9. (Year: 2005).*

Kim, You-Jin et al., "Prediction of a Movie's Success From Plot Summaries Using Deep Learning Models", *Master's Thesis, Sungkyunkwan University*, 2019 (56 pages in English).

Kim, You-Jin., "Prediction of a Movie's Success From Plot Summaries Using Deep Learning Models", *Proceedings of the Second Workshop on Storytelling.* 2019 (pp. 1-9).

Cho, YongWoo et al., "Character Level Bi-Directional LSTM-CNN Model for Movie Rating Prediction", Korea Institute Science Society, Jun. 2018 (pp. 1009-1011).

"Movie review analysis using python (Web crawling & natural language processing)", *Messier*, May 8, 2019 (6 pages in English and 9 pages in Korean).

Minsu Jung., "Natural language processing (NLP), 16th day (ELMo)", *Medium*, Jun. 19, 2019 (7 pages in English and 9 pages in Korean).

"AI Used in Movie Industries. Are Accurate Predictions of Success Possible!?", *Economicfocus*, Aug. 21, 2019 (3 pages in English and 7 pages in Korean).

Korean Office Action dated Mar. 22, 2021 in counterpart Korean Patent Application No. 10-2019-0179963 (8 pages in Korean).

\* cited by examiner

PREDICTION OF MEDIA SUCCESS FROM PLOT SUMMARIES USING MACHINE LEARNING MODEL

CROSS-REFERENCE TO RELATED APPLICATION(S)

This application is based on and claims priority under 35 U.S.C. 119 to Korean Patent Application No. 10-2019-0179963, filed on Dec. 31, 2019, in the Korean Intellectual Property Office, the disclosure of which is herein incorporated by reference in its entirety.

TECHNICAL FIELD

The disclosure relates to machine learning-based media success prediction through plot summary.

DESCRIPTION OF RELATED ART

Artificial intelligence technology consists of machine learning (deep learning) and element techniques using machine learning.

Machine learning is an algorithm technique that it itself may classify and learn the features of input data. The component technology is a technique for mimicking the human brain's perception and decision capabilities using a machine learning algorithm (e.g., deep learning), and this may be divided into several technical fields, such as linguistic understanding, visual understanding, inference/prediction, knowledge expression, and operation control.

In the field of linguistic understanding, some attempts have been made to predict, via machine learning, the success or failure of media, including a movie or TV show, before the media is released to general consumers using only the plot summary of the media. However, methods of predicting the success of a movie using spoilers suffer from poor performance and low reliability due to insufficient training data and test data. Although there are other attempts that use both factors that may be gathered after the move is released, as well as movie plot summary, they are unable to predict whether media will succeed or fail for the purpose of decision-making on media production or investment.

SUMMARY

The disclosure aims to address the foregoing issues and/or needs.

The disclosure aims to implement a machine learning-based media success prediction through plot summary, which may predict the success rate of media using only the plot summary of the media.

According to an embodiment, a method comprises performing preprocessing on text data including a plot summary, calculating a sentiment score from the preprocessed text data using a first model, generating first input data using the calculated sentiment score, generating second input data from the preprocessed data using a second model, and determining a candidate class of content corresponding to the plot summary by applying the first input data and the second input data to a pre-trained third model. The candidate class includes a first class indicating success and a second class indicating failure.

The candidate class may include a first class indicating success and a second class indicating failure.

The plot summary may include at least one of a movie, a musical, a concert, a play, a sports game, an exhibition, a book or music.

Performing the preprocessing may dividing the text data into sentences.

Performing the preprocessing may include generating a list of the sentences of the text data.

The sentiment score may include a positive score, a negative score, a neutral score, or a compound score.

The first model may be a neural network model trained by providing information for the sentiment score and the preprocessed text data, as training data.

The first model may be a valence aware dictionary for sentiment reasoning (VADER) sentiment analyzer.

The sentiment score may be an N-dimensional vector. Calculating the sentiment score may include calculating the sentiment score for each of a plurality of sentences constituting the plot summary, in reverse order from a last sentence among the plurality of sentences. When a number of the sentences is M which is less than N, zero-padding may be applied to as many remaining dimensions as N–M.

The second model is an embeddings from language models (ELMO) model.

Generating the first input data may include generating a first feature vector by applying the sentiment score to a merged one-dimensional convolutional neural networks (1D CNN).

Generating the first input data may include generating a first vector by applying the sentiment score to a first bidirectional long short-term memory (LSTM), generating a second vector by applying the sentiment score to a second bidirectional LSTM, and generating a second feature vector by adding the first vector and the second vector.

Determining the candidate class may include generating a concatenated vector by concatenating the first input data and the second input data, and determining the candidate class of the content corresponding to the plot summary by applying the concatenated vector to the pre-trained third model.

The third model may be a classification model pre-trained based on a plot summary for training, labeled with a success score for the content. The plot summary for training may be the preprocessed text data.

The success score for the content may be an evaluation score of a consumer for the plot summary for training. The evaluation score being X or more may be classified as the first class indicating success, and the evaluation score being less than Y may be classified as the second class.

According to an embodiment, X may be different from Y.

The machine learning-based media success prediction through plot summary, according to an embodiment of the disclosure provides the following effects.

In the disclosure, it is possible to predict the success rate of media using only the plot summary of the media.

Effects of the disclosure are not limited to the foregoing, and other unmentioned effects would be apparent to one of ordinary skill in the art from the following description.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Hereinafter, exemplary embodiments of the disclosure are described in detail with reference to the accompanying drawings. The same reference denotations may be used to refer to the same or similar elements throughout the specification and the drawings, and no duplicate description is given. As used herein, the terms "module" and "unit" are provided solely for ease of description and these terms may be used interchangeably but rather than being distinct in meaning or role. When determined to make the subject matter of the disclosure unclear, the detailed description of the known art or functions may be skipped. The accompanying drawings are provided merely for a better understanding of the disclosure and the technical spirit or the scope of the disclosure are not limited by the drawings.

The terms coming with ordinal numbers such as 'first' and 'second' may be used to denote various components, but the components are not limited by the terms. The terms are used to distinguish one component from another.

It will be understood that when an element or layer is referred to as being "on," "connected to," "coupled to," or "adjacent to" another element or layer, it may be directly on, connected, coupled, or adjacent to the other element or layer, or intervening elements or layers may be present. In contrast, when a component is "directly connected to" or "directly coupled to" another component, no other intervening components may intervene therebetween.

As used herein, the singular forms "a," "an," and "the" are intended to include the plural forms as well, unless the context clearly indicates otherwise.

It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

<Success Prediction Device>

Figure 1:
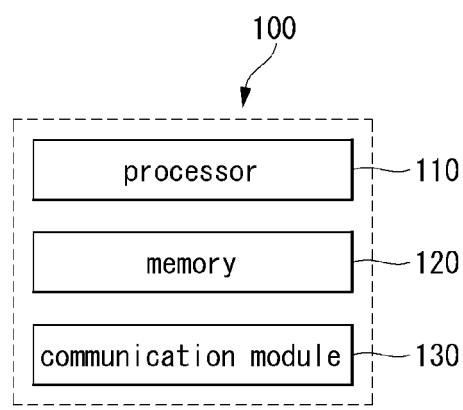
FIG. 1 is a block diagram illustrating a success prediction device according to an embodiment of the disclosure.

FIG. 1 is a block diagram illustrating a success prediction device according to an embodiment of the disclosure.

Referring to FIG. 1, a success prediction device 100 may include at least one processor 110, a memory 120, and a communication module 130.

The processor 110 may include one or more application processors (APs), one or more communication processors (CPs), or at least one or more artificial intelligence (AI) processors. The application processor, communication processor, or AI processor 110 may be separately included in different integrated circuit (IC) packages or may be included in one IC package.

The application processor may control multiple hardware and software components connected to the application processor by driving an operating system or application programs, and the application processor may process or compute various data including multimedia data. For example, the application processor may be implemented as a system on chip (SoC). The processor 110 may further include a graphic processing unit (GPU) (not shown).

The communication processor may manage a data link and convert a communication protocol in communication between the success prediction device 100 and other electronic devices connected to the success prediction device 100 through a network. As an example, the communication processor may be implemented as an SoC. The communication processor may perform at least some of multimedia control functions.

The communication processor may control data transmission/reception of the communication module 130. The communication processor may be implemented to be included as at least a part of the application processor.

The application processor or the communication processor may load commands or data received from at least one of a nonvolatile memory 120 or other components connected thereto to the volatile memory 120 and process the same. The application processor or the communication processor may store, in the non-volatile memory 120, data received from at least one of the other components or data generated by at least one of the other components.

The processor 110 (in particular, an AI processor) may learn a neural network using a program stored in the memory 120. The processor 110 may learn a neural network for recognizing data related to operations of the success prediction device 100. Here, the neural network may be designed to simulate a human brain structure (e.g., the neuron structure of the human neural network) on a computer. The neural network may include an input layer, an output layer, and at least one hidden layer. Each layer includes at least one neuron having a weight, and the neural network may include synapses connecting the neurons. In the neural network, each neuron may output an input signal input through the synapse, as a function value of an activation function for weight and/or bias.

A plurality of network nodes may send and receive data according to their respective connection relationships so as to simulate the synaptic activity of neurons that send and receive signals through synapses. In a deep learning model, a plurality of network nodes may be located in different layers and exchange data according to a convolutional connection relationship. Examples of neural network models include a deep neural network (DNN), a convolutional neural network (CNN), a recurrent neural network, a restricted Boltzmann machine, a deep belief network, a deep Q-Network, or such various deep learning schemes and may be applied in fields such as vision recognition, speech recognition, natural language processing, and voice/signal processing.

The processor 110 performing the above-described functions may be a general-purpose processor (e.g., CPU) or may be an AI-dedicated processor (e.g., GPU) for artificial intelligence learning.

In various embodiments of the disclosure, the processor 110 may extract a sentiment score based on text data composed of plot summaries of various contents and determine whether or not the content is successful using only the plot summaries using the extracted sentiment score and various neural network models. A detailed description is made below with reference to FIG. 2 and its subsequent figures.

The memory 120 may include an internal memory or external memory. The internal memory may include, e.g., a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a NAND flash memory, or a NOR flash memory). According to an embodiment, the internal memory may take the form of a solid state drive (SSD). The external memory may include a flash drive, e.g., a CF (compact flash) memory, an SD (secure digital) memory, a micro-SD memory, a mini-SD memory, an xD (extreme digital) memory, or a Memory Stick™.

The memory 120 of the box-office prediction device 100 according to an embodiment of the disclosure may store a learning corpus composed of a plurality of sentences. The learning corpus may include text data composed of various languages and/or accents. The learning corpus may be text data gathered through a sensor (not shown) or a camera (not shown) of the success prediction device 100 or received from a communicable external terminal using the communication module 130. The memory 120 may store a learning model generated through a learning algorithm for classification/recognition of data according to an embodiment of the disclosure. Furthermore, the memory 120 may store input data of a learning model, training data, or a learning history.

The communication module 130 may include a wireless communication module or an RF module. The wireless communication module may include, e.g., Wi-Fi®, Bluetooth® (BT), global positioning system (GPS) or near field communication (NFC). For example, the wireless communication module may provide a wireless communication function using a radio frequency. Additionally or alternatively, the wireless communication module may include a network interface or modem for connecting the success prediction device 100 with a network (e.g., Internet, local area network (LAN), wide area network (WAN), telecommunication network, cellular network, satellite network, plain old telephone service (POTS) or 5G network).

The RF module may be responsible for data transmission/reception, e.g., transmitting and receiving data RF signals or invoked electronic signals. As an example, the RF module may include, e.g., a transceiver, a PAM (power amp module), a frequency filter, or an LNA (low noise amplifier) (not shown). The RF module may further include parts (e.g., conductors or wires) for communicating radio waves in a free space upon performing wireless communication.

The success prediction device 100 according to various embodiments of the disclosure may be implemented as at least one of a server, TV, refrigerator, oven, clothes styler, vacuum robot, drone, air conditioner, air purifier, PC, speaker, home security camera, lighting, washing machine, and smart plug. Since the components of the success prediction device 100 described in connection with FIG. 1 are example components typically provided in electronic devices, the success prediction device 100 according to the embodiment of the disclosure is not limited by the above-described components and, as necessary, may omit or add components.

Figure 2:
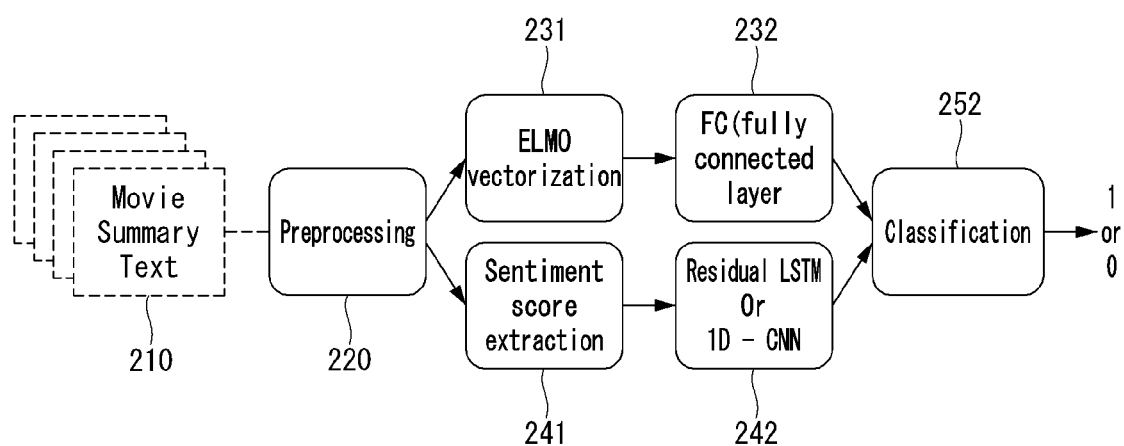
FIG. 2 is a block diagram illustrating a success prediction process according to an embodiment of the disclosure.

FIG. 2 is a block diagram illustrating a success prediction process according to an embodiment of the disclosure.

Referring to FIG. 2, the processor 110 of the success prediction device 100 may collect training data in order to generate a deep learning or machine learning-based neural network model for success prediction. In this case, the training data used for training the neural network model may be pre-processed in a predetermined form in order to implement the learning efficiency and/or high performance of the neural network model. In an embodiment, the processor 110 may extract, through the preprocessing module 220, text data composed of plot summaries of content on a per-sentence basis. The content is one or more performances or works that may have a plot summary, and includes, but is not limited to, at least one of movies, musicals, concerts, plays, sports games, exhibitions, books, and music. FIG. 2 illustrates an example in which the content is a movie, but various embodiments or scope of the disclosure is not limited thereto or thereby.

In an embodiment of the disclosure, the processor 110 may create a list of the data extracted in units of sentences through the preprocessing module 220. The so-generated sentence list may include at least one sentence in the form of a list. The sentence list may be used as input data when a context vector or a sentiment score is generated or calculated later.

The processor 110 of the success prediction device 100 may apply the preprocessed data to a first model 241 or a second model 231. Here, the first model 241 may be defined as a sentiment score extraction module, and the second model 231 may be defined as an ELMO vectorization module.

Figure 3:
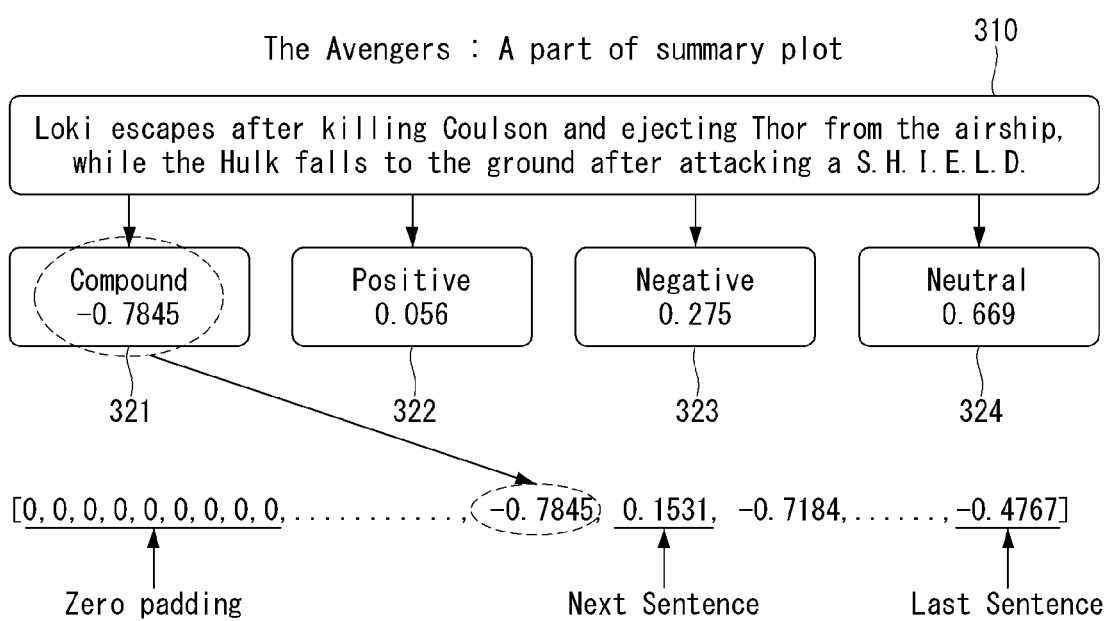
FIG. 3 is a view illustrating an example process of extracting a sentiment score according to an embodiment of the disclosure.

The first model 241 may be a neural network model trained by providing information for sentiment scores and preprocessed data, as training data. The sentimental scores may include positive scores, negative scores, neutral scores, or compound scores. The compound score may represent the sum of the sentiment scores for all normalized vocabulary between −1 (the maximum negative score) and +1 (the maximum positive score). As an example, the first model 241 may be implemented as a VADER sentiment analyzer. The sentiment score generated using the first model 241 may be expressed as an N-dimensional vector. For example, the N dimension may be 198 dimensions. This is because in the case of a movie, the longest plot summary has 198 sentences. N may be varied to correspond to the number of sentences of the longest plot summary of each content based on the type of content. In one embodiment, the sentiment score for each of the plurality of sentences constituting the plot summary may be calculated in reverse order from the last sentence among the plurality of sentences and, when the number (=M) of the sentences is less than N, zero-padding may be applied to as many remaining dimensions (or sentences) as (N−M). Referring to FIG. 3, the processor 110 may obtain a positive score 322 of 0.056, a negative score 323 of 0.275, and a neutral score 324 of 0.669 for the sentence "Loki escapes after killing Coulson and ejecting Thor from the airship, while the Hulk falls to the ground after attacking a SHIELD" (310), using the first model 241, and may apply their respective weights to the scores, obtaining a compound score 321 of −0.7845. The sentence may be a Oth (O is a natural number) sentence from the last sentence. When the plot summary input to the first model 241 includes P sentences (P is a natural number less than N), P+1, . . . , N-dimensional vector spaces have O's as zero padding is applied. This does not affect the performance of the success prediction process. The reason for processing the sentiment factor as shown in FIG. 3 is that the number of sentences included in each of the plurality of plot summary differs and, in light of the general plot summary configuration, the highlight is highly likely to be positioned at the end.

The processor 110 may generate an embedding vector from the preprocessed data (e.g., the plurality of sentences constituting the plot summary or the sentence list extracted from the plurality of sentences) using the second model 231.

In one embodiment, the second model 231 may be implemented as an ELMO, as described above. The embedding method by Word2vec and Glove is used in various types of natural language processing (NLP), but the embedding method by Word2vec and Glove cannot deal with words having different meanings depending on the context, such as homophones. Thus, according to an embodiment, the second model 231 uses an ELMO embedding method that generates different embedding vectors according to contexts.

The processor 110 may apply the sentiment score generated using the first model 241 to merged 1D-CNN or residual bidirectional LSTM. The processor 110 may apply the embedding vector generated using the second model 231 to the FC layer 232. The processor 110 may generate a concatenated vector by concatenating the feature vector generated merged 1D-CNN or residual bidirectional LSTM 242 and the feature vector generated from the ELMO model and the FC layer. The so-generated concatenated vector may be applied as an input to a pre-trained third model 252. The third model 252 is a neural network-based classification model and is a classification model that has been supervised-trained based on the pre-processed plot summary for training and a success score for the content of the plot summary for training.

Figure 4A:
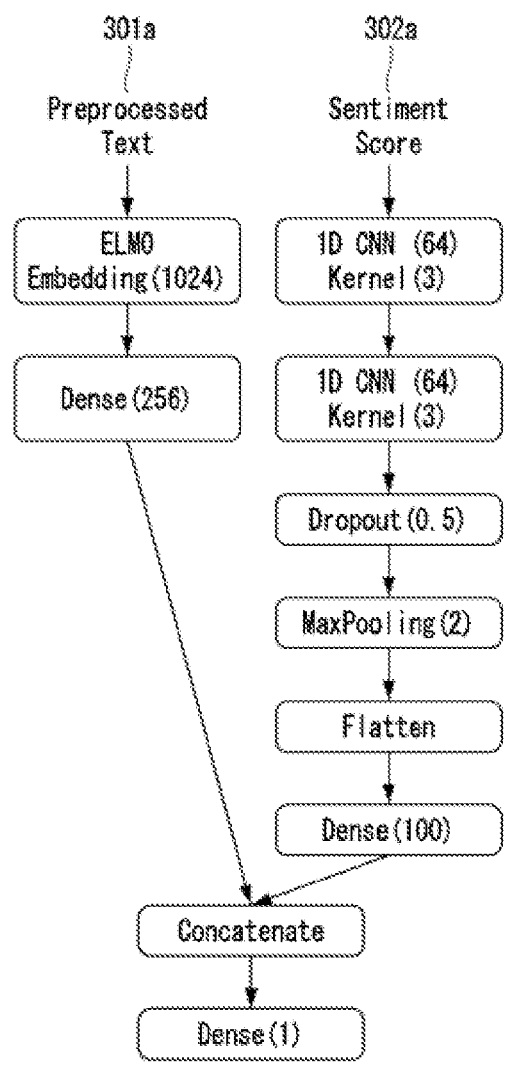
FIG. 4A is a view illustrating a process of generating a feature vector using merged 1D-CNN.
Figure 4B:
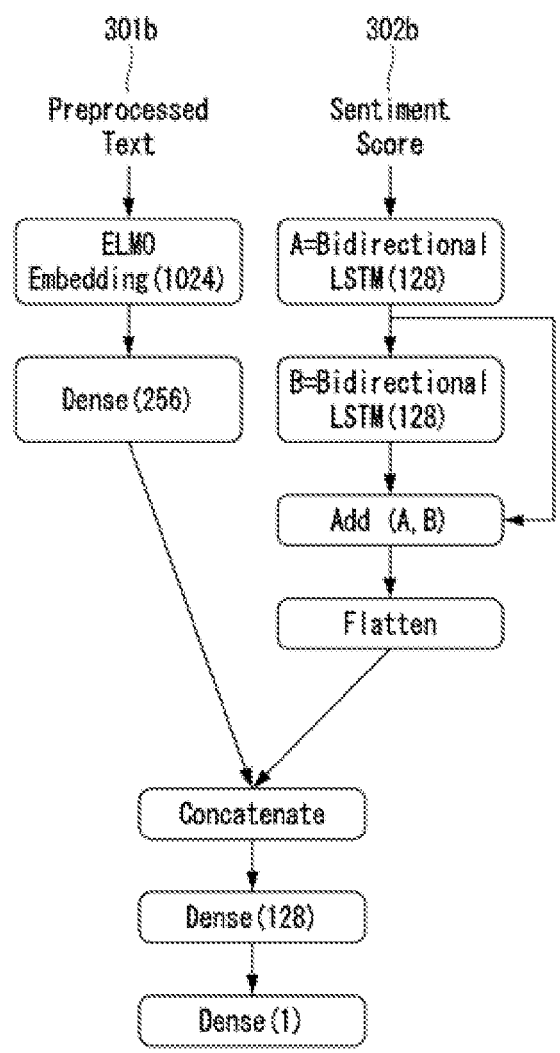
FIG. 4B is a view illustrating a process of generating a feature vector using residual bidirectional LSTM.

FIG. 4A is a view illustrating a process of generating a feature vector using merged 1D-CNN, and FIG. 4B is a view illustrating a process of generating a feature vector using residual bidirectional LSTM.

Figure 5:
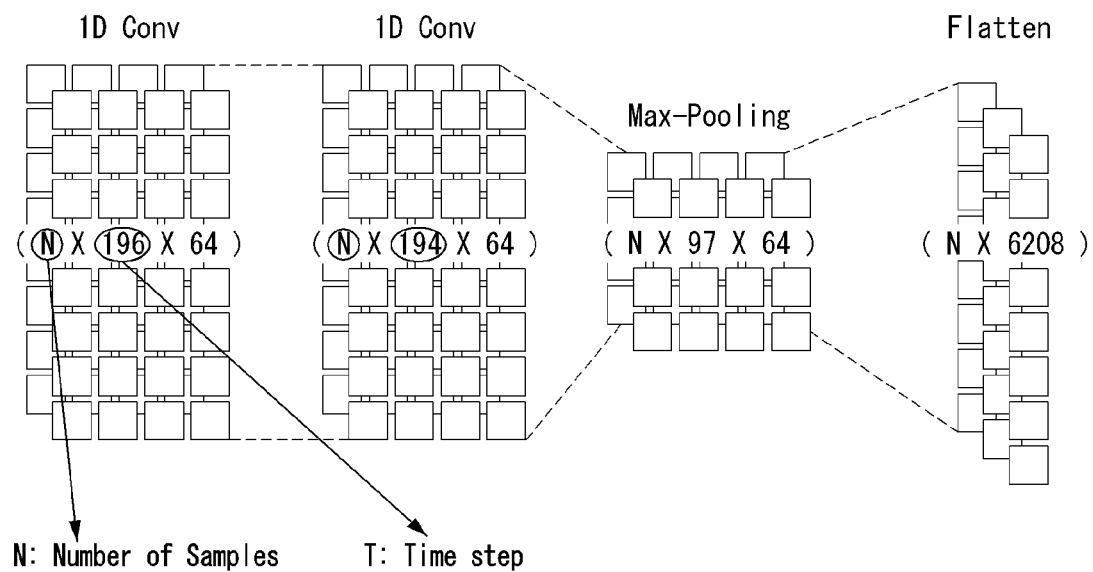
FIG. 5 is a view illustrating 1D CNN.

Referring to FIG. 4(a), the processor 110 may input preprocessed text 301a to an ELMO and may input a vector representing a sentiment score 302a to a merged 1D-CNN. ELMO embedding enters a vector of 1024 dimensions as mean-pooling applies to the sentence vector of each movie plot summary and may be a vector of 256 dimensions through a fully-connected layer (FC). The sentiment vector representing the sentiment score is calculated through the 1D CNN layer, as shown in FIG. 5, and a convolution operation of (198−3+1) is performed through a 64-dimensional feature detector and a 3-size kernel. As a result of performing the convolution operation, a vector of (Z X 196×64) dimensions is formed (Z is the number of samples). The following 1D CNN is also computed under the same process, forming a (Z X 196×64)-dimensional vector. The so-formed vector forms a vector with the main characteristics reduced in half in the max pooling layer, and the dimensions are expanded through the flatten layer to be combined with the result of ELMO embedding. As an example, as a result of expanding the dimensions, the sentiment vector may be expressed as a feature vector having 100 dimensions. The processor 110 generates an input value of the classification model by combining the 256-dimensional feature vector extracted from the above-described preprocessed text and the 100-dimensional feature vector extracted from the sentiment score and determines whether the content succeeds (1) and/or fails (0) with the classification model generated according to the generated input value.

In the process of generating a feature vector using the residual bidirectional LSTM of FIG. 4(b), ELMO embedding is the same as that of FIG. 4(a) using 1D CNN. In the case of FIG. 4(b), the dependence of a long sentence may be mitigated by using two bidirectional LSTMs. Specifically, the processor 110 may summate the output values of the first bidirectional LSTM and the second bidirectional LSTM and flatten the result of the summation. In this case, the input of the second bidirectional LSTM may be an output of the first bidirectional LSTM. The processor 110 may combine the feature vector extracted from the preprocessed text 301b and the feature vector based on the sentiment score 302b, and determine whether the content succeeds (1) and/or fails (0).

The success prediction device according to various embodiments of the disclosure may use a binary cross-entropy error as a loss function in order to binary-classify the result value as 1 or 0.

Figure 6:
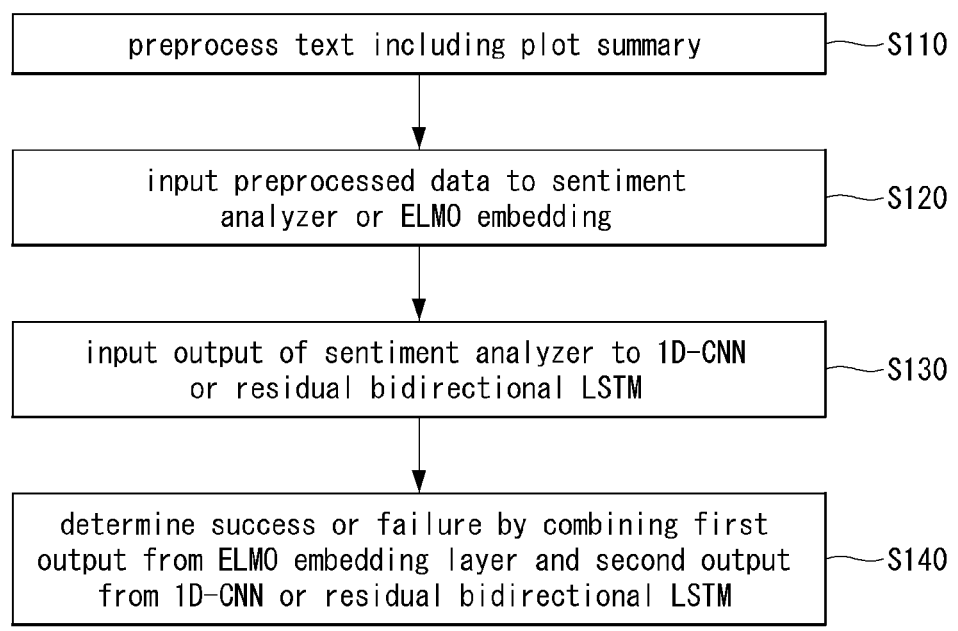
FIG. 6 is a flowchart illustrating a success prediction method according to an embodiment of the disclosure.

FIG. 6 is a flowchart illustrating a success prediction method according to an embodiment of the disclosure.

Referring to FIG. 6, the processor 110 of the success prediction device 100 may perform pre-processing on the text including the plot summary (S110). The plot summary includes a plot summary about at least one of a movie, musical, concert, play, sports game, exhibition, book or music. The preprocessing process may include either a method of dividing the text data composed of plot summaries into sentence units or a method of dividing the text data composed of plot summaries into sentence units and generating a list including a plurality of sentences from the divided sentence units.

The processor 110 may input the preprocessed data into a first model (e.g., VADER sentiment analyzer) or a second model (e.g., ELMO) (S120). Specifically, the processor 110 may calculate a sentiment score (e.g., a positive score, a negative score, a neutral score, or a compound score) from the preprocessed data using the first model. The first model may be a neural network model pre-trained by providing information for sentiment scores and preprocessed data, as training data. In various embodiments of the disclosure, the sentiment score may be expressed as an N-dimensional sentiment vector. The sentiment vector is generated by calculating the sentiment score for each of the plurality of sentences continuously from the last sentence among the plurality of sentences constituting the plot summary. When the number (=M) of the plurality of sentences is less than N, the processor 110 may apply zero padding to as many remaining dimensions as (N−M) of the dimensions of the sentiment vector.

The processor 110 may generate first input data using the calculated sentiment score. Specifically, in various embodiments of the disclosure, the processor 110 may input an output of a sentiment analyzer to 1D-CNN or residual bidirectional LSTM (S130), and the first input data may be generated as an output of the 1D-CNN or residual bidirectional LSTM. The processor 110 may generate second input data from the preprocessed data, using the second model. The first input data and the second input data may be generated in the form of a vector and may then be applied as input data to the classification model.

The processor 110 may combine the output of the ELMO embedding layer and the output of 1D-CNN or residual bidirectional LSTM and apply the same to the classification model and, based on the result, determine whether the content succeeds or fails (S140). Specifically, the processor 110 may determine a candidate class of the content corresponding to the plot summary by applying the first input data and the second input data to a pre-trained third model. The candidate class may include a first class indicating success and a second class indicating failure. More specifically, the processor 110 may generate a concatenated vector by combining the first input data and the second input data, and applies the generated concatenated vector to a pre-learned classification model, determining the candidate class of the content corresponding to the plot summary. In this case, the classification model is a classification model that is pre-trained based on plot summaries for training, labeled with success scores for the content, and the plot summaries for training may be composed of pre-processed text data. The success score for the content is the evaluation score of the consumer for plot summary for training, and if the evaluation score is X or more, it may be classified as the first class indicating success, and if it is less than Y, it may be classified as the second class indicating failure. In this case, X and Y may have different values.

The above-described embodiments of the disclosure may be implemented in code that a computer may read out of a recording medium. The computer-readable recording medium includes all types of recording devices storing data readable by a computer system. Examples of the computer-readable recording medium include hard disk drives (HDDs), solid state disks (SSDs), silicon disk drives (SDDs), read-only memories (ROMs), random access memories (RAMs), CD-ROMs, magnetic tapes, floppy disks, or optical data storage devices, or carrier wave-type implementations (e.g., transmissions over the Internet). Thus, the above description should be interpreted not as limiting in all aspects but as exemplary. The scope of the disclosure should be determined by reasonable interpretations of the appended claims and all equivalents of the disclosure belong to the scope of the disclosure.

What is claimed is:

1. A processor-implemented method, comprising:
performing preprocessing on text data and a success score, wherein the text data only includes a plot summary about a story of a content, and the success score corresponds to the content;
calculating a sentiment score for each of a plurality of sentences constituting the plot summary from the pre-processed text data using a first model, wherein the sentiment score which is an N-dimensional vector is calculated in reverse order from a last sentence among the plurality of sentences, and when a number of the sentences M is less than N, zero-padding is applied to as many remaining dimensions as N−M;
generating first input data as an output of a merged one-dimensional convolution neural network (1D CNN) or residual bidirectional long short-term memory (LSTM) by applying the calculated sentiment score to the merged 1D CNN or residual bidirectional LSTM;
generating second input data from the preprocessed text data using a second model including an embeddings from language models (ELMO) model; and
determining a candidate class of content corresponding to the plot summary by combining the first input data as a first output from the merged 1D CNN or residual bidirectional LSTM and the second input data as a second output from the ELMO embedding layer, and applying the first input data and the second input data to a pre-trained third model,
wherein the third model is a classification model pre-trained based on only a training plot summary about a story of a content, labeled with the success score corresponding to the content, and the training plot summary is the preprocessed text data,
wherein the candidate class includes a first class indicating success and a second class indicating failure, and
wherein the success score is an evaluation score previously evaluated by a consumer for the content.

2. The processor-implemented method of claim 1, wherein the plot summary includes at least one of a movie, a musical, a concert, a play, a sports game, an exhibition, a book or music.

3. The processor-implemented method of claim 1, wherein performing the preprocessing includes dividing the text data into sentences.

4. The processor-implemented method of claim 3, wherein performing the preprocessing includes generating a list of the sentences of the text data.

5. The processor-implemented method of claim 1, wherein the sentiment score includes a positive score, a negative score, a neutral score, or a compound score.

6. The processor-implemented method of claim 1, wherein the first model is a neural network model trained by providing information for the sentiment score and the pre-processed text data, as training data.

7. The process-implemented method of claim 1, wherein the first model is a valence aware dictionary and sentiment reasoner (VADER) sentiment analyzer.

8. The processor-implemented method of claim 1, wherein generating the first input data includes generating a first feature vector by applying the sentiment score to the merged one-dimensional convolutional neural network (1D CNN).

9. The processor-implemented method of claim 1, wherein:
generating the first input data includes:
generating a first vector by applying the sentiment score to a first bidirectional long short term memory (LSTM),
generating a second vector by applying the sentiment score to a second bidirectional LSTM; and
generating a second feature vector by adding the first vector and the second vector.

10. The processor-implemented method of claim 1, wherein:
determining the candidate class includes:
generating a concatenated vector by concatenating the first input data and the second input data; and
determining the candidate class of the content corresponding to the plot summary by applying the concatenated vector to the pre-trained third model.

11. The processor-implemented method of claim 1, wherein the evaluation score being X or more is classified as the first class, and the evaluation score being less than Y is classified as the second class.

12. The processor-implemented method of claim 11, wherein X is different from Y.

13. A non-transitory computer system-readable recording medium recording a program for executing the method of claim 1, on a computer system.

* * * * *